United States Patent [19]

Larsson

[11] Patent Number: 4,922,056
[45] Date of Patent: May 1, 1990

[54] SURFACE MOUNTED BOX

[75] Inventor: Arne Larsson, Orebro, Sweden

[73] Assignee: Network Communications, Inc., Orange, Va.

[21] Appl. No.: 154,574

[22] Filed: Feb. 10, 1988

[51] Int. Cl.⁵ ............................................. H05K 5/00
[52] U.S. Cl. .................................. 174/65 R; 174/52.1; 174/66; 439/472
[58] Field of Search ...................... 174/65 R, 50, 52 R, 174/53, 66; 439/470, 472; 220/3, 2; 24/136 R

[56] References Cited

U.S. PATENT DOCUMENTS

| | | | |
|---|---|---|---|
| D. 286,739 | 11/1986 | Larsson | D8/353 |
| D. 286,740 | 11/1986 | Larsson | D8/353 |
| 2,359,054 | 9/1944 | Schonitzer et al. | 220/3.8 |
| 2,938,741 | 5/1960 | Lowery | 285/128 |
| 2,997,575 | 8/1961 | Schwartz | 362/364 |
| 3,303,264 | 2/1967 | Saul et al. | 174/48 |
| 3,400,247 | 9/1968 | Deacon | 219/345 |
| 3,495,276 | 2/1970 | Suess | 52/270 |
| 3,676,571 | 7/1972 | Rubinstein | 174/65 R |
| 3,859,454 | 1/1975 | Mann | 174/66 |
| 3,864,511 | 2/1975 | Morby et al. | 174/58 |
| 3,873,759 | 3/1975 | Schindler et al. | 174/65 R |
| 3,952,908 | 4/1976 | Carson | 220/18 |
| 4,202,457 | 5/1980 | Tansi | 220/3.3 |
| 4,295,575 | 10/1981 | Flachbarth | 220/3.92 |
| 4,296,870 | 10/1981 | Balkwill et al. | 220/3.3 |
| 4,371,757 | 2/1983 | Debortoli et al. | 174/60 |
| 4,558,172 | 12/1985 | Zetena | 174/66 |
| 4,591,658 | 5/1986 | Bauer et al. | 174/65 R |
| 4,649,230 | 3/1987 | Nielsen | 174/65 R |
| 4,697,720 | 10/1987 | Hotchkiss et al. | 220/337 |

FOREIGN PATENT DOCUMENTS

2114569 3/1972 Fed. Rep. of Germany .... 24/136 R
3607760 10/1986 Fed. Rep. of Germany .

Primary Examiner—Leo P. Picard
Assistant Examiner—David A. Tone
Attorney, Agent, or Firm—Lowe, Price, LeBlanc, Becker & Shur

[57] ABSTRACT

An electrical box for securing a sheathed cable extending along a support wall to a connector is disclosed, preferably for use in a local area network computer communications system. The connection box comprises a mounting base, a cover plate, and a connection box. The mounting base has pairs of smooth cylindrical posts of different height respectively formed along edges of the base. The sheathed cable extending through an opening in the connection box is clamped between one pair of posts by a clamping bar screwed against upper post ends. A method of temporarily positioning the cover plate carrying the connector to the connection box is also disclosed allowing an installer to use both hands to electrically connect the cable to the connector. In an alternate preferred embodiment, the connection box is secured to the mounting base without screws by means of anchoring feet and retaining lugs formed along common end portions of the base and connection box and a latch arm arrangement at opposite end portions of the base and box for securing the parts together in snap-fitting engagement. In accordance with a further preferred embodiment, the sheathed cable may be clamped to the mounting base by means of a pair of clamping jaws slidable along one edge of the mounting base within a slide track integrally formed in the mounting base upper surface.

35 Claims, 6 Drawing Sheets

Fig. 17   Fig. 18   Fig. 19

SURFACE MOUNTED BOX

TECHNICAL FIELD

The present invention relates generally to connection boxes with provision for securing a non-metallic sheathed electrical or fiber optic cable within the box for connection and, more particularly, to an improved cable clamping structure preventing inadvertent movement of the cable in the box. In another sense, the invention relates to an electrical or fiber optic connection box for use in a local area network computer communications system.

BACKGROUND ART

Electrical connection boxes are formed with breakouts in side walls thereof that are selectively removable to define an opening through which an electrical cable extends into the box. In a local area network computer communications system, a typical setup involves the use of a sheathed cable extending along and mounted to the wall surface between, for example, two different computer terminals (e.g., date processing) locations within a common building. The cables are secured to connectors mounted to the box providing for rapid connection/disconnection of computer equipment to the box via the connector (e.g., pin connector, coax connector, fiber optic connector, etc.). The system is generally a low voltage system which, under most governmental regulations, may be installed by a computer technician instead of an electrician.

It is important that the cable be securely mounted within the box since electrical disconnection can result in a loss of valuable computer data transmitted between different locations through the cable. Such electrical disconnection can occur, for example, by the application, whether inadvertent or not, of a force tending to pull the cable out of the box; or by the application of the force dislodging the connection box from the support wall. In either instance, electrical disconnection of the cable and subsequent repair is expensive considering the cost of the installing technician's labor.

It is accordingly one object of the present invention to provide a surface mounted electrical connection box equipped with a reliable clamping arrangement for securing the cable within the box to improve and maintain the integrity of the electrical connection between the cable and connector.

Another object of the invention is to provide a clamping arrangement that is integrally formed with the connection box components and therefore requires only simple tools to effect easy installation and reduce labor costs.

Another object of the invention is to provide an electrical connection box and cable clamping arrangement therefor in which the clamping force exerted by the box against the cable is greater than a nominal exertion force applied to the cable or the box which exertion force dislodges the box from the mounting wall without effecting the integrity of the electrical connection. Therefore, a subsidiary object of the invention is to permit reinstallation of the box to the wall with the electrical connection unimpaired using a source of labor that is less than the cost of installing technician's labor.

Yet another object is to provide a clamping arrangement within an electrical connection box wherein a strong clamping force is applied to the cable without causing abrasion of the cable sheathing and possible cable malfunction causing a loss of data.

Yet another object is to provide a clamping arrangement for a cable in an electrical surface mounted connection box that is capable of accommodating cables of different diameter without loss of clamping force.

Electrical connection boxes of a type set forth above typically include a number of components such as the connection box itself into which the cable terminates and a cover plate containing the connector electrically connected to the cable. Frequently, during installation, it is necessary to first affix the connector to the cover plate and the cable within the mounted connection box before electrically connecting the cable leads to the connector. The connection process is often difficult since the technician must use one hand to hold or balance the cover plate against the connection box while attempting to secure the leads to the connector terminals. This is highly undesirable since it adds to the cost of the installing technician's labor that has a multiplying effect particularly when installing a large number of connection boxes throughout, for example, an entire building project in which profitable installation of the computer system is possible only if every necessary step is applied to reduce installation costs.

Therefore, yet another object of the invention is to provide an electrical connection box and subcomponents thereof that are connected together at a minimum installation cost and which sub-components may be preferably manufactured with high production molds.

Yet another object is to provide components for an electrical connection box that may be optionally manufactured with molded components integrally formed therewith for providing temporary support of the cover plate to the connection box enabling the installer to use both hands for wiring the cable to the connector.

Still a further object is to provide subcomponents of an electrical connection box that may be secured to each other with a minimum number of or no screws to further decrease installation time and costs.

DISCLOSURE OF THE INVENTION

A connection box, in accordance with the present invention, comprises a mounting base adapted to be surface mounted against a support wall and a cover plate mounted to the base. The cover plate supports a connector and the mounting base provides clamping support for a sheathed cable running along the support wall and extending through an opening formed between the mounting base and cover plate to terminate in connection with the connector. The mounting base has a clamping arrangement for clamping the cable to the base and for preventing lateral movement of the cable within the box relative to the opening. The connection box may also be used to connect fiber optic cables.

In a preferred embodiment, the clamping arrangement includes a clamping bar and a pair of posts respectively formed on opposite sides of the opening and projecting upwardly from the base along one edge thereof. The cable passes through the opening and extends between the posts. The clamping bar is secured to upper ends of the post and exerts a clamping force against the cable urged against the base. The clamping bar has opposite ends captivating screws received in upper ends of the posts. A central clamping section of the bar spanning the posts exerts clamping force against the sheathed cable.

Preferably, opposing surfaces of the clamping bar and base between the posts are serrated gripping surfaces each provided with at least one ridge adapted to bite into the surface of the non-metallic cable sheathing. The ridges provided on the respective surfaces may extend in different directions for improved clamping effect.

The height of the posts preferably corresponds to the outer diameter of the sheathed cable and the nominal distance between the underside of the clamping section of the clamping bar and the upward exposed surface of the base between the posts is slightly less than the cable outer diameter. One manner of effectuating this relationship is to form the central clamping section in a plane offset from the plane in which the opposite ends of the clamping bar are commonly disposed.

In accordance with another feature of the invention, a plurality of pairs of posts are provided with each pair respectively extending along one edge of the base. Each post pair is preferably of different height for selectively accommodating cables of varying diameter.

In an alternate preferred embodiment, the clamping arrangement includes at least a pair of clamping jaws mounted and retained on the base through a slide track having a slide channel integrally formed along a base edge. Each clamping jaw includes a base interfitting within the slide channel. The clamping jaw portion projects upwardly from the slide track.

The slide channel includes a raised central section extending longitudinally within the channel. The base of each clamping jaw has side base portions moving between the raised central section and the slide track and retained on the mounting base by the slide track. The base of one of the clamping jaws has a lower surface formed with a recess; the bottom of the recess faces towards the upper surface of the raised central section and is spaced therefrom a predetermined distance during sliding movement. The other of the clamping jaws is formed with a locking tongue projecting from the clamping jaw between its side base portions; the locking tongue is configured to ride along the central raised section for insertion into the recess of the first clamping jaw to effect locking contact with the recess bottom for securing the clamping jaws together in clamping contact with the cable extending between the jaws. With this configuration, the clamping jaws are adjustable by infinitely variable amounts to accommodate virtually any size cable.

The upper surface of the locking tongue engageable with the recessed bottom is formed with a plurality of ridges or serrations engaging like ridges and serrations on the recessed bottom to effect the locking engagement. The geometry of the slide channel, base portions and locking tongue may be further configured such that movement of the first and second clamping jaws towards each other enabling the locking tongue to enter the recess also effects a wedging contact of the locking tongue in the recess to prevent movement of the jaws in opposite or unclamping directions. Each clamping jaw surface projecting upwardly from the slide track may be formed with vertical serrations or ridges that 'bite' into the non-metallic cable sheathing to prevent undesirable movement of the cable along its longitudinal axis.

The clamping jaw and slide track arrangement facilitates reliable fastening of the cable to the mounting base without the need for screws. Since the clamping jaws are adjustable by incremental or infinitely variable amounts, these components may be standardized.

The box according to the present invention may further comprise a cable box extending between the base and cover plate. The box has side walls with at least one of the walls containing the opening through which the cable extends into the box interior. The side wall preferably has a breakout or knockdown defining the opening. The breakout section is therefore or lesser thickness than surrounding portions of the side wall to facilitate knockdown.

In accordance with a further aspect of the invention, the breakout section is preferably a plurality of breakout sections formed within each other and of progressively lesser thickness in the direction away from the surrounding side wall portions. The plural breakout sections may be provided in each side wall to enable use of any side wall for receiving the cable. Thus, orientation of the box is virtually unrestricted. The mounting base is formed with a plurality of optional slots and openings for securing the base to the support wall with conventional fasteners. The connection box is formed with a pair of mounting ears along one edge thereof. The ears are adapted to captivate screws securing the connection box to the base, in cooperation with a pair of feet extending from another lower edge of the box (parallel and opposite the edge supporting the mounting ears). The anchoring feet are insertable beneath one edge of the base to facilitate attachment of the connection box to the base with only two screws.

In an alternate preferred embodiment, the mounting base is rectangular having a length dimension greater than its width dimension. The connection box is correspondingly shaped. One or more cover plates (in side-by-side relation) may be secured to the connection box. The clamping arrangement in the form of a single clamping bar and supporting post pair or multiple clamping bars and corresponding post pairs may be formed spaced from each other along one or both lengthwise edges of the mounting base adjacent corresponding breakout sections in the connection box. In the alternative embodiment, a slide track may extend along the lengthwise edge with a sufficient number of clamping jaws to accommodate one or more cables entering the connection box at spaced locations from each other.

Corresponding one edges of the mounting base and connection box may be formed with anchoring feet and retaining lugs while opposite one ends contain a latch arm arrangement. The said opposite one end of the connection box is pivotal about an axis defined by the anchoring feet/retaining lugs and capable of snapfitting engagement to the said opposite end of the mounting base, eliminating attachment of the connection box to the base by means of screws.

The clamping arrangement is in the form of the clamping bar and supporting posts exerts a clamping force preventing relative movement between the clamped portion of the cable and the base. In accordance with a preferred feature of the invention, the nominal clamping force $F_2$ is greater than a nominal minimum exertion force applied either as a pulling force F on the cable or as a force $F_1$ against the connection box side walls to dislodge the base from the support wall or the connection box from the base. In either occurrence, the integrity of the electrical connection between the cable and connector is unaffected. In this manner, remounting of the box to the wall can proceed at a minimum labor cost without incurring the cost of a technician's labor.

The connection box is of rectangular configuration and the breakout sections communicate with rear edges of the side walls. The front opening of the connection box is preferably a recessed opening defined by ledges spaced inwardly from the forward edges of the side walls. Substantially coplanar with these ledges are mounting projections adapted to receive screws captivated by the cover plate mounted in the forward opening of the box. The outer dimensions of the cover plate correspond to the recessed opening enabling the cover plate to interfit into the opening against the ledges.

Installation of the box in accordance with the invention proceeds by first attaching the base to the wall with screws or other conventional fasteners. The end portion of the cable is then positioned within the confines of the base by passing the cable between a pair of posts corresponding in height to the cable diameter. The cable is securely clamped to the base with the clamping bar screwed to the post upper end. Next, in one embodiment, the connection box is secured to the base by inserting the anchoring feet beneath one of the base edges provided with recesses receiving the feet and snapping the remaining rear edges of the connection box around the corresponding base edges now captivated within the box. Two screws are then used to secure the other end of the box to the base via the mounting ears if the latch arm arrangement of the preferred embodiment is not used.

At this point, the cover plate is temporarily supported on the connection box by inserting one edge of the plate against the ledge extending along the lower edge of the box. The cover plate projects perpendicularly from the box and is secured to the mounting projection formed adjacent the lower edge by means of a support hook. This temporary support advantageously enables the installing electrician to use both hands in connecting the cable leads to the connector terminals to reduce labor costs. Thereafter, the temporary supporting hook is removed and the cover plate is mounted in assembled relationship to the connection box.

The temporary supporting hook is preferably in the form of a U-shaped member having inherent springiness to enable one leg to engage the mounting projection while the other leg is biased against an edge wall of the cover plate interfitted against the lower ledge. This U-shaped temporary supporting hook, in accordance with one feature of the invention may be integrally formed with one of the components of the box and secured thereto by means of a frangible section.

The various components of the present invention are preferably molded entirely of plastic in an injection molding process, having suitable rigidity and springiness, although the various sub-components of the invention can be manufactured with other materials and processes. Still other objects, advantages and novel feature of the invention will become apparent from the following description taken in conjunction with the drawings.

BEST MODE FOR CARRYING OUT THE INVENTION

Figure 1:
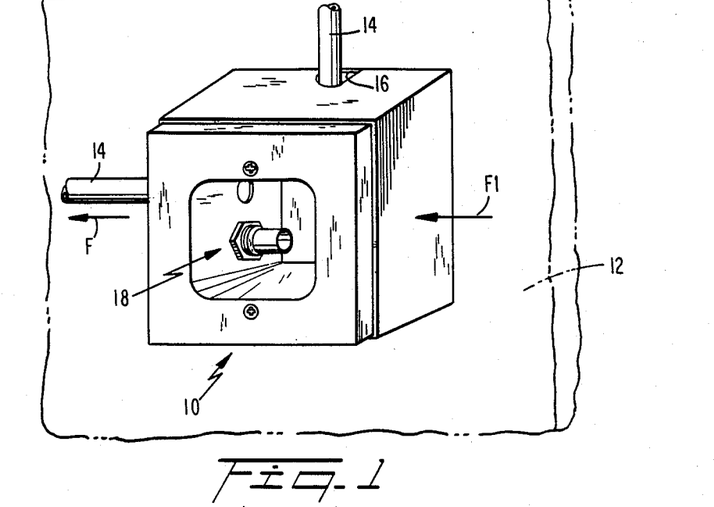
FIG. 1 is a perspective view of the connection box of the invention in operative mounted location on a wall.
Figure 2:
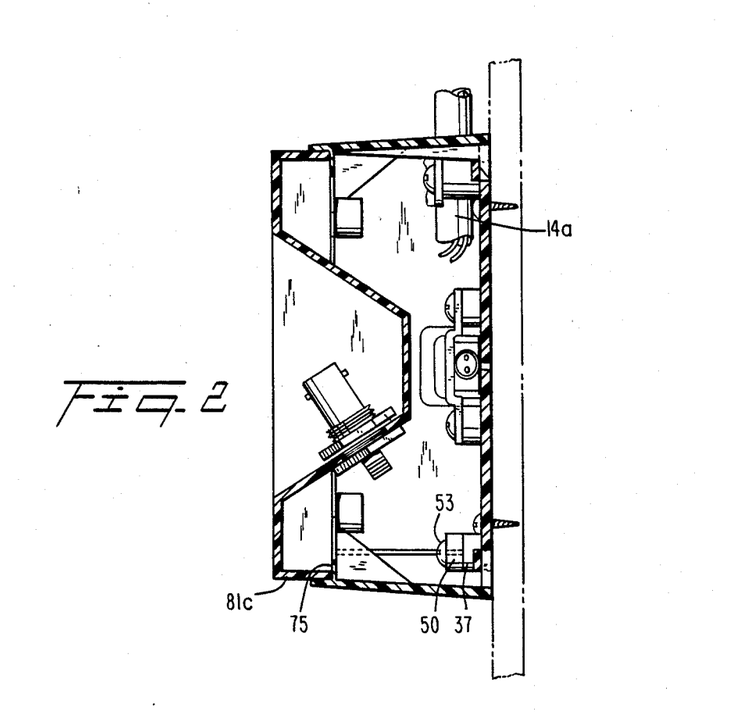
FIG. 2 is a cross-sectional view of the mounting base, connection box and cover plate in assembled relationship.
Figure 3:
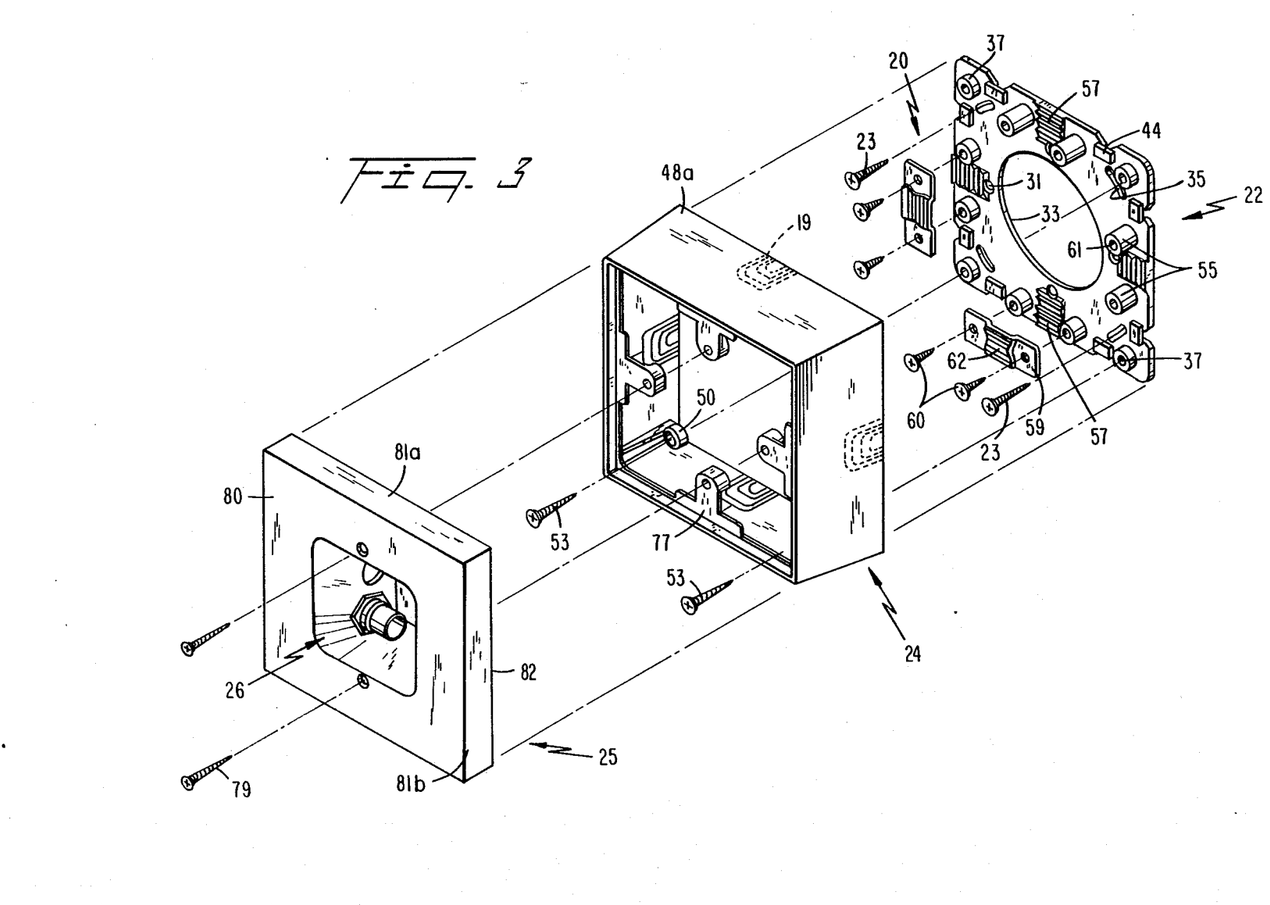
FIG. 3 is an exploded perspective view of the mounting base, connection box and cover plate.

Reference is now made to FIG. 1-3 wherein a preferred embodiment of electrical box 10 according to the present invention is surface mounted to a wall 12. One or more conventional non-metallic sheathed cables 14 extend along the wall 12 into box 10 through a cable entrance 16 for electrical connection to a conventional connector 18 (e.g., coaxial connector, pin connector, etc.). Cable entrance 16, as depicted in FIG. 3, is initially covered by a breakout or knockdown section 19 which is easily removable to enable insertion of cable 16 in the manner described below.

In a preferred embodiment of the present invention, boxes 10 are wall mounted at multiple locations within a common building facility for connection to each other (and/or to an incoming line) via the cables 14. The cables 14 carry data between computer stations (not shown) respectively connected to boxes 10 via connectors 18; the aforesaid arrangement jointly establishes a local area network computer communications system. Particularly in this type of environment, it is crucial that electrical disconnection between any cable 14 and its connector 18 does not occur since this may result in a valuable loss of data which is disruptive of business and frequently requires manual data re-entry at considerable cost. Since cables 14 and boxes 10 are often surface mounted to an interior wall surface in the manner depicted in FIG. 1, and therefore protrude from the wall surface, they are susceptible to damage which may be caused by a desk chair inadvertently bumping into the connection box or brushing against one of cables 14, resulting in exertion of a force F or $F_1$ tending to pull the cable 14 out of the box 10, i.e., undesirable electrical disconnection occurs.

Although the provision of cable clamps are known for fixedly securing cables within an outlet or box, the present invention features an improved cable clamping arrangement 20, discussed more fully below, that not only resists longitudinal movement of the cable 14 into and out of opening 16 but also resists lateral movement of the cable relative to side walls of the opening.

More specifically, box 10 of the present invention comprises a mounting base 22 securable to wall 12, a connection box 24 fastened to the base and containing breakouts 19 forming the openings 16, and a cover plate 25 formed with a recessed opening 26 into which connector 18 is mounted. Such a recessed opening 26 is known, for example, from the present inventor's U.S. Des. Nos. 286,739 and 286,740, both issued Nov. 18, 1987.

In preferred practice, the aforesaid components and sub-component parts thereof described more fully below are preferably manufactured entirely from a relatively inexpensive thermoplastic material having the necessary resiliency, strength and flexibility and, in addition, capable of manufacture by an extrusion process.

Figure 5:
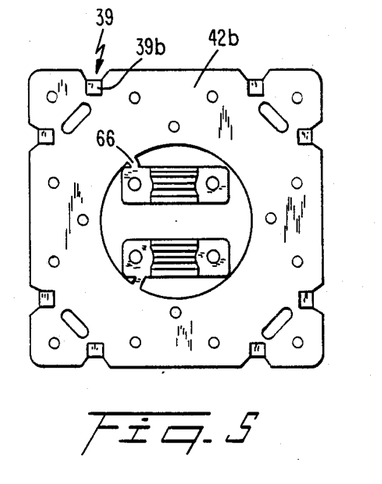
FIG. 5 is a rear plan view of the mounting base.

Mounting base 22 is a substantially flat rectangular member formed with four mounting holes 31 equispaced about central opening 33 and four corner banana slots 35 selectively employed to captivate conventional fasteners (e.g., screws 23) to secure the mounting base to the exterior surface of wall 12. Base 22 further includes four corner projections 37 projecting from the front mounting base surface 42b. Between adjacent corner projections 37 there are disposed a pair of recessed portions 39 of Y-shaped configuration in rear plan view (FIG. 5). Each recess 39 includes a first recess portion defined by converging side walls 39a which extend from the associated peripheral edge 40 of the mounting base and which side walls are open to the top and bottom sides 42a and 42b of the base. Each recess 39 also includes a second recess portion 39b of rectangular plan view which is open to the bottom 42b of the mounting base 22 and concealed from the top 42a by a retaining lug or cover portion 44. The second recess 39b communicates with first recess 39a.

Figure 9:
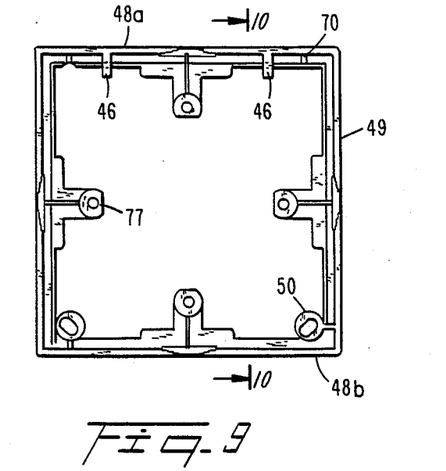
FIG. 9 is a front plan view of the connection box.
Figure 10:
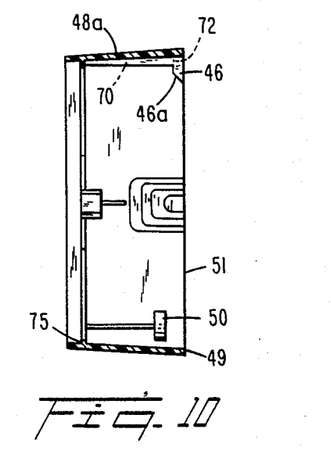
FIG. 10 is a sectional view taken through the line 10—10 of FIG. 9.

The mounting projections 37 and recesses 39 provide the sole means in the preferred embodiment of the invention for attaching connection box 24 to mounting base 22. As can be seen in FIG. 3, 9 and 10, rectangular connection box 24 comprises four side walls 48a, 48b, 48c, 48d having coplanar rear or bottom edges 49 and coplanar front or top edges 51. The edges 49, 51 are preferably generally parallel to each other. One edge 49 (along the nominally designated top wall 48a of connection box 24 in FIG. 3) includes a pair of mounting feet 46 projecting inwardly from the wall 48a of the connection box while the opposite parallel wall 48b has a pair of mounting ears 50 formed adjacent interior corners thereof. Ears 50, as best shown in FIGS. 2 and 10, are spaced a distance from bottom edge 49 approximately equal to the height of mounting projections 37.

To attach cable box 24 to mounting base 22 (previously fastened to wall 12 with screws 23), mounting or anchoring feet 46 are initially inserted into recesses 39 so that their inclined leading end portions 46a are captivated beneath cover formations 44. Since mounting feet 46 have leading portions which are inclined as at 46a, the mounting feet inclined portions 46a advantageously enable initial insertion of the mounting feet beneath cover formations 44 by sliding top edge 48a along the wall 12 downwardly towards and in alignment with 39, while holding connection box 24 at an angle (i.e., bottom edge 48b held away from the mounting base 22). This allows the side walls 48c, 48d and bottom wall 48b of the connection box 24 to initially clear the mounting base structure and, once the mounting feet 46 extend fully into the recesses 39a, 39b, i.e., with the peripheral edge of the mounting base 22 approaching or in contact with the interior bottom edge wall surface of wall 48a, the bottom oriented wall 48b of the connection box can then be lowered towards the base so that the mounting ears 50 rest on the associated mounting projections 37. The ears 50 and mounting projections 37 are then fastened to each other with screws 53 and all four peripheral edges 40 of the mounting base are captivated by and held against lower interior edges of the connection box walls 48a–48d.

The cable clamping arrangement 20 according to the present invention comprises pair of cylindrical cable guide posts 55 formed along each edge 40 and projecting upwardly from top surface 42a of mounting base 22. The posts 55 are formed in the center portion of the associated peripheral edge 40 and associated posts formed along a common edge 40 are spaced from each other by a serrated gripping surface 57.

Figure 7:
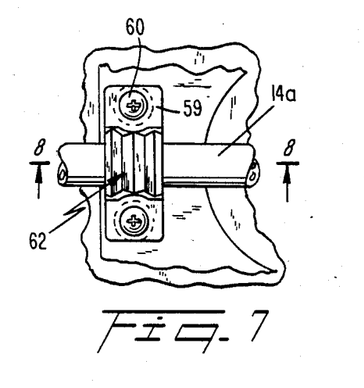
FIG. 7 is an enlarged partial front plan view of a cable clamping bar operatively mounted to the base.
Figure 8:
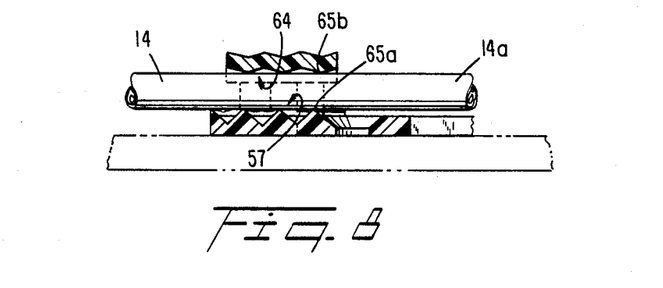
FIG. 8 is a sectional view taken through the line 8—8 of FIG. 7 depicting the cable in clamped relationship with the base.

In assembled relationship, breakouts 19 in each wall 48a–48d of connection box 24 is in alignment with the associate gripping surface 57 formed on mounting base 22 with the corresponding cylindrical guide posts 55 respectively located outwardly adjacent the opening side walls 16a. To clamp a cable 14 between a pair of cable guide posts 55, a clamping bar 57 is fastened to upper ends of the posts as best depicted in FIGS. 7 and 8. The clamping bar 57 has opposite ends defining mounting flanges 59 captivating screws 60 extending into screw holes 61 formed in the posts 55. The mounting flanges 59 are preferably coplanar and spaced from each other by a central clamping section 62 having a serrated surface 64 similar to and opposing the gripping surface 57 formed between the associated posts 55. Thus, cable 14 is clamped between a selected pair of posts 55 by screwing mounting flanges 59 against upper ends of the cable guide posts with the screws 60 so that gripping surfaces 57, 64 (FIG. 8) contact lower and upper portions of the cable sheathing.

Figure 6:
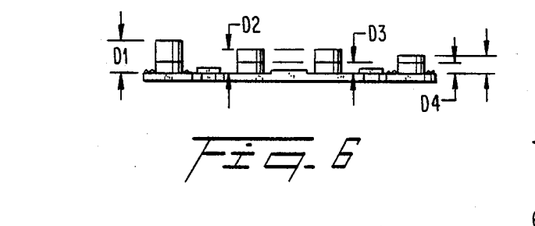
FIG. 6 is a side elevational view of the mounting base.

In accordance with a unique feature of the present invention, the four pairs of cable guide posts 55 are of different heights $D_1$, $D_2$, $D_3$ and $D_4$, as best depicted in FIG. 6. With this novel configuration, a substantially constant, predetermined clamping force can also be exerted by clamping bar 57 against a cable 14 by positioning mounting base 22 so that a desired pair of posts 55 having a height substantially corresponding to the cable outer diameter is in alignment with the incoming cable.

Figure 4:
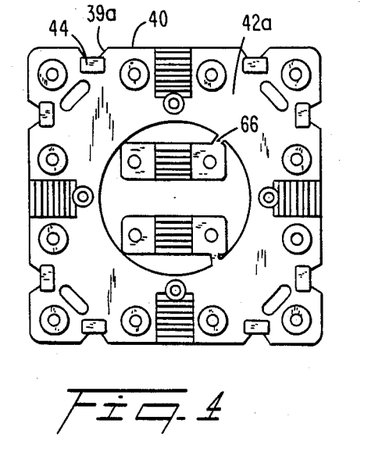
FIG. 4 is a detailed front plan view of the mounting base.

The clamping bars 57 may be integrally formed with mounting base 22 and secured within central opening 33 by frangible sections 66 (see FIGS. 4 and 5). Since mounting base 22, clamping bar 57 and frangible sections 66 are all preferably molded thermoplastic material, the clamping bars are easily removed from the mounting base prior to use.

The central clamping section 62 of each clamping bar 57 is preferably formed in a plane that is offset and parallel to the plane containing mounting flanges 59. In this manner, the serrated gripping surface 64 formed on the central clamping section 62 may be positioned at one of two heights in relation to the gripping surface 57 by simply inverting the clamping bar. Thus, in the event that the height of the cable guide posts 55 differs slightly from the diameter of sheet cable 14, this difference is compensated for by mounting clamping bar 57 to posts 55 so that clamping section 62 is either slightly below the upper ends of the posts (cable diameter slightly smaller than the post height) or above the upper ends (cable diameter slightly greater than the post height).

The serrated gripping surfaces 57 and 64 include plural ridges 65a and 65b that may extend parallel to each other as depicted in FIG. 7 and 8. However, it may be possible to improve clamping action by forming the ridges 65a so that they extend perpendicular in relation to the ridges 65b (this latter arrangement not shown).

Figures 10A, 11:
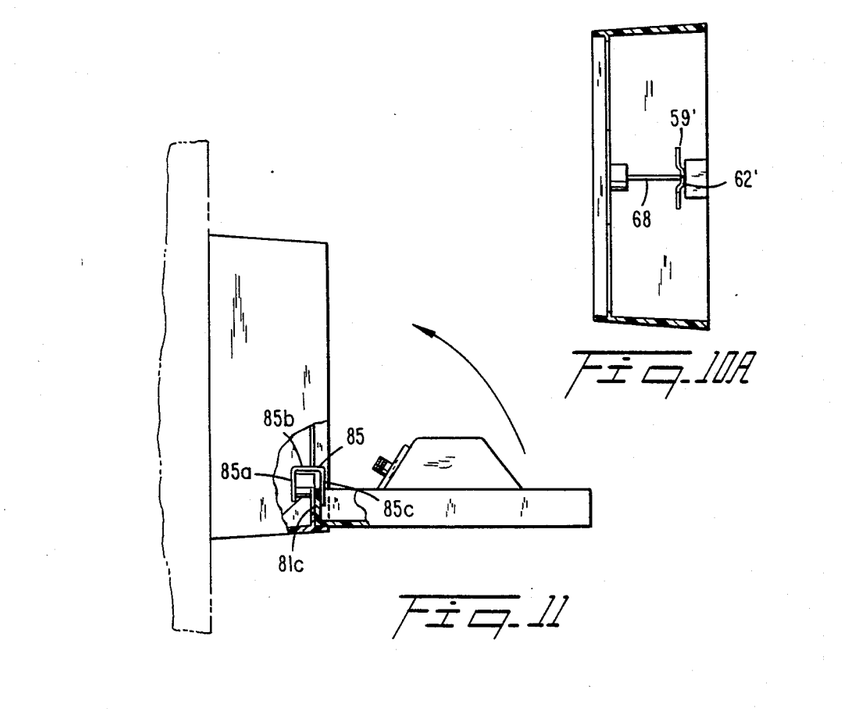
FIG. 10A is a view similar to FIG. 10 but of an alternate embodiment of the clamped bar arrangement of the present invention.
FIG. 11 is a side plan view of a unique intermediate stage of assembling the cover plate to the connection box.

FIG. 10A is an illustration of an alternative embodiment of clamping arrangement 20 in which the clamping bars 57 are integrally formed with each side wall 48a–48d and project inwardly therefrom so that mounting flanges 59' are juxtaposed atop cable guide posts 55 in assembled relationship. Each clamping bar 57' is spaced from bottom edge 49 by a distance $D_1$, $D_2$, $D_3$ and $D_4$, respectively so that the flanges engage the upper ends of the cable guide posts and exert a clamping force against cables 14. A reinforcing gusset 68 projecting inwardly from and integrally formed with the associated side walls 48a–48d engages the clamping section 62' to ensure that a substantially constant clamping force is exerted against the cable 14 when connection box 24 and mounting base 22 are assembled. In the alternative arrangement of FIG. 10A, it is unnecessary to secure flanges 59' to the upper ends of cable guide posts 55 as in the preferred embodiment of the present invention.

It is to be further noted that side wall 48a carrying mounting feet 46 is also formed with a pair of reinforcement ribs 70 located respectively between mounting feet 46 and opposite ends of the side wall 48a. Each rib 70 has a downward facing surface 72 (FIGS. 9 and 10) that is spaced from bottom edge 49 by a distance equal to the thickness of mounting base 22. Thus, in assembled relationship, the surfaces 72 bear against top surface 42a of mounting base 22, while mounting feet 46 bear against the lower surface of cover formations 44. The surfaces 72 and feet 46 thus serve to lock the captured edge 40 of the mounting base to ensure that the edge 40 is operatively positioned against the lower edge surface of wall 48a.

The front opening of connection box 24 is a recessed opening defined by ledges 75 spaced inwardly from forward edges 51 of side walls 48a–48d (FIG. 3). Substantially coplanar with these ledges 75 are mounting projections 77 adapted to receive screws 79 captivated by the cover plate 25 mounted in the forward opening of the connection box 24. The outer dimensions of the cover plate 25 correspond to the dimensions of the recessed opening (i.e., between the interior surfaces of walls 48a–48d) enabling the cover plate 26 to interfit into the opening against the ledges 75 (see FIG. 2).

More specifically, cover plate 25 includes a front wall 80 surrounding recessed portion 26 in which connector 18 is mounted. Side walls 81a–81d project rearwardly from peripheral edges of front wall 80. The free edges 82 of walls 81a–81d abut against the ledges 75 in assembled relationship.

Installation of box 10 in accordance with the invention proceeds by first attaching base 22 to wall 12 with screws 23 or other conventional fasteners. The end portion 14a of cable 14 is then positioned on base 22 by passing cable 14 between a selected pair of posts 55 corresponding in height to the cable diameter. Cable portion 14a is then securely clamped to base 22 with clamping bar 57 screwed to the upper end of posts 55. Next, the connection box is secured to base 22 by inserting anchoring feet 46 beneath cover formations 44 in the manner described supra and snapping the remaining rear edges 49 of the connection box 24 around the corresponding base edges 40 now captivated within the box. Two screws 53 are then used to secure the other end of box 24 to base 22 via mounting ears 50.

At this point, the cover plate 25 is temporarily supported on the connection box 24 by positioning one side wall 81c of the cover plate against the lower ledge 75 as depicted in FIG. 11. The cover plate temporarily projects perpendicularly from the box 24 and is temporarily supported on the box by abutment against ledge 75 and a temporary supporting hook 85. This temporary supporting hook has a U-shaped configuration with one leg 85a and cross leg 85b extending around one of mounting projections 77 while the other leg 85c engages the inner surface of wall 81c as shown in FIG. 11. The temporary support hook 85 advantageously enables the installing electrician to use both hands in connecting the cable 14 leads to the connector terminal 18. Thereafter, the temporary supporting hook 85 is removed and the cover plate 25 is mounted in assembled relationship to connection box 24 as described supra.

The temporary supporting hook 85 is preferably in the form of a U-shaped member as discussed supra, wherein legs 85a–85c have inherent springiness to enable one leg 85a to engage the mounting projection while the other leg 85c is biased against edge wall 81c of the cover plate interfitting against the lower ledge 75. This U-shaped temporary supporting hook 85, in accordance with one feature of the invention, may be integrally formed with one of the components of box 10 and secured thereto by means of a frangible section in a manner similar to sections 66.

Figure 12A:
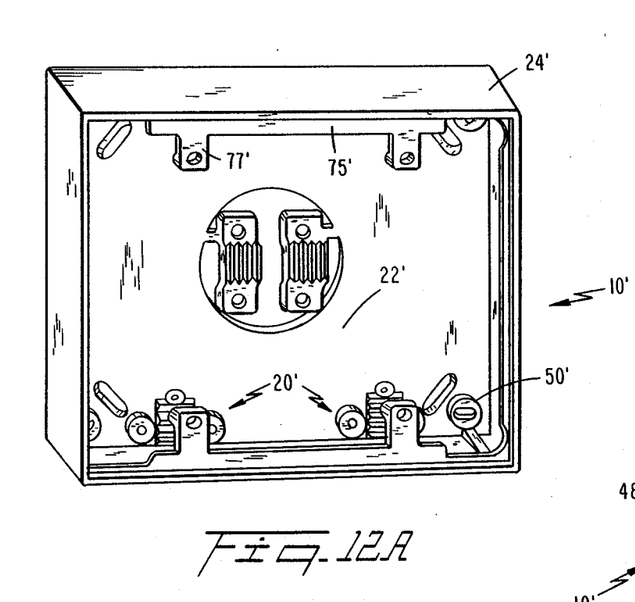
FIG. 12A is a perspective view an alternative preferred embodiment of a mounting base and connection box.
Figure 12B:
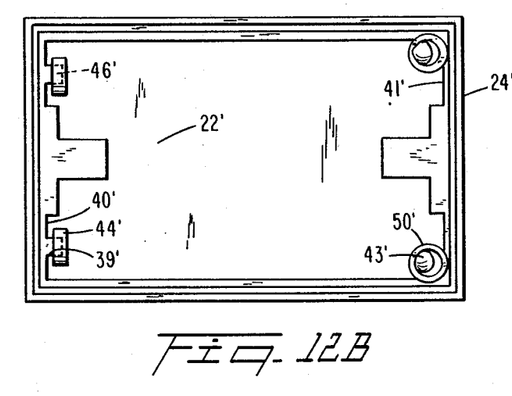
FIG. 12B is a partial schematic, top plan view of an alternate locking structure for securing the connection box to the mounting base without screws.
Figure 12C:
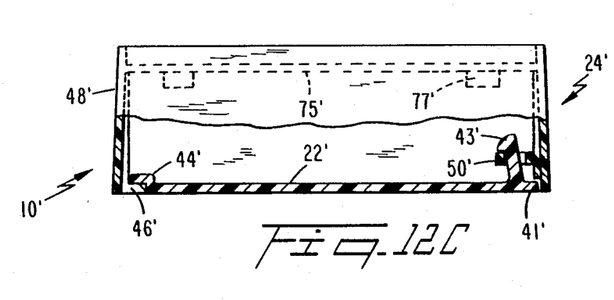
FIG. 12C is a sectional view along the line 12C—12C of FIG. 12B.

FIGS. 12A, 12B and 12C are illustrations of an alternate preferred embodiment of the present invention in which mounting base 22' and connection box 24' are of rectangular configuration having a lengthwise dimension greater than the widthwise dimension with dimensions similar to either single or double electrical junction boxes typically employed throughout the United States. Although base 22' and box 24' may be identical to base 22 and box 24 discussed supra, apart from the dimensional changes corresponding to standard code in the United States, the box 10' of FIGS. 12A–12C may also be formed with a pair of cable clamping arrangements 20' formed along a common lengthwise edge of mounting base 22'. Each cable clamping arrangement 20' may be identical to cable clamping arrangement 20 discussed supra.

The connection box 24' may include ledges 75' and mounting projections 77' having substantially the same structure and function as ledges 75 and projections 77 discussed supra. However, as depicted in FIG. 12A, ledges 75' preferably extend along a major portion of the lengthwise side walls of box 24'. Furthermore, opposing pairs of mounting projections 77' preferably captivate screws extending through a pair of rectangular cover plates (not shown) mounted side-by-side within the front opening of box 24'. In other words, the length of the cover plate (otherwise identical to the structure of cover plate 25) is parallel to the width of connection box 24' and the width of the cover plate is approximately one half the length of the connection box to enable two cover plates to nest within the connection box front opening against ledges 75'.

FIGS. 12B and 12C are illustrations of an alternative mounting structure for securing connection box 24' to the mounting base 22' without screws. As will be appreciated from the description below, this alternative mounting structure can also be used to secure connection box 24 to the mounting base 22 in substitution for mounting ears 50 and screws 53. As depicted in FIGS. 12B and 12C, a widthwise edge 40' of mounting base 22' is formed with rectangular recesses 39' having retaining lugs or cover formations 44' functionally and somewhat structurally similar to lugs 44 discussed supra. The lower edge of a widthwise side wall 48a' of connection box 24' is formed with anchoring feet adapted to interfit within recesses 39' beneath lugs 44'. The anchoring feet 46' are similar to the mounting feet 46 discussed supra. The opposite widthwise edge 41' of mounting base 22' is formed with latching arms 43' adapted to interfit with elongate slots formed in mounting ears 50' secured to the side wall of connection box 24' as depicted in FIG. 12C. By inserting the feet 46' into recesses 39' and then pivoting the opposite widthwise edge of box 24' towards the corresponding edge of base 22', the latch arms engage the slots of mounting ears 50' for snap-fitting engagement as depicted in FIG. 12C. With this alternative arrangement, connection box 24' may be mounted the base 22' without screws.

FIGS. 13-19 are illustrations of an alternate preferred embodiment in substitution or conjunction with cable clamping arrangements 20-20' for use in either box 10 or 10'. The cable clamping arrangement 100 comprises a slide track 102 formed of rails 104 and 106 projecting from the upper surface of the base and integrally formed therewith to define a slide channel 108 open at opposite ends of the tracks. The tracks 104 and 106 extend parallel to one of the edges of base 22 or 22' in lieu of cable clamping arrangements 20 or 20'. First and second clamping jaws 110 and 112, respectively formed with slide bases 110a and 112a discussed infra interfitting for sliding movement within channel 108 (by respective insertion of the slide bases into the open opposite channel ends), have jaw members 110b and 112b projecting upwardly from tracks 104, 106 to contact the sheathed cable in clamping engagement.

Figure 15:
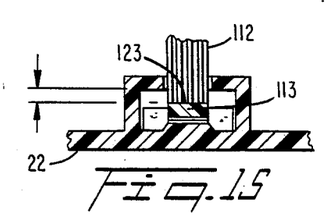
FIG. 15 is a sectional view taken along the line 15—15 of FIG. 14.
Figure 16:
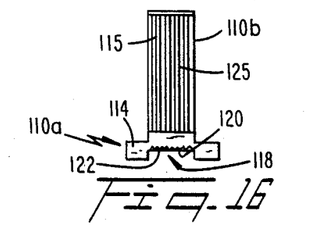
FIG. 16 is a sectional view taken the line 16—16 of FIG. 17 of a first clamping jaw according to the alternate preferred embodiment.
Figures 17, 18:
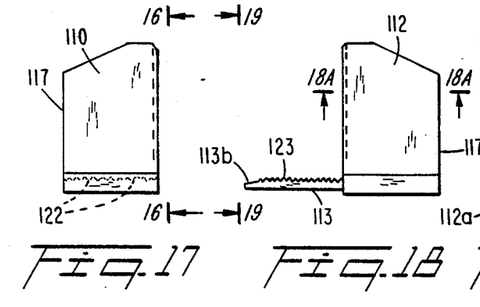
FIG. 17 is a side or profile plan view of the first clamping jaw.
FIG. 18 is a side or plan profile view of a second clamping jaw according to the alternate preferred embodiment.
Figures 18A, 19:
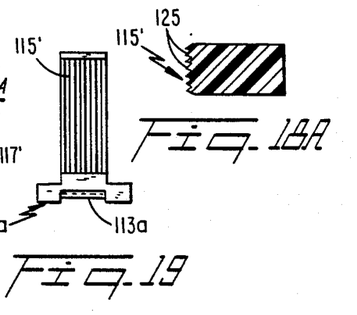
FIG. 18A is a sectional view taken along the line 18A—18A of FIG. 18.
FIG. 19 is an end elevational view of the second clamping jaw.

With reference to FIGS. 14-19 and particularly FIGS. 16 and 17, the first clamp 110 and slide base 110a thereof includes side base portions 114 having a height less than the height 116 of slide channel 108 for smooth sliding movement therewithin. A downward facing recess 118 is formed between the side base portions 114; the recess 118 has a recess bottom wall 120 formed with ridges or serrations 122 as depicted in FIG. 17. The recess 118 is dimensioned such that recess bottom wall 120 is juxtaposed above central raised section 108' of channel 108 and spaced above the upper surface of the raised section to receive a locking tongue 113 formed on second jaw 112 in wedging or locking engagement in the manner described infra.

The second jaw 112 and base 112a thereof also has side base portions slidable within channel 108 on opposite sides of the central raised section 108'. The locking tongue 113 projects longitudinally from the slide base 112a between the side base portions and is adapted to ride upon the central raised section 108' (i.e., with its lower surface 113a contacting the upper surface of the central raised section) during sliding movement of the second jaw 112 within the channel as depicted in FIG. 15.

Figures 13, 14:
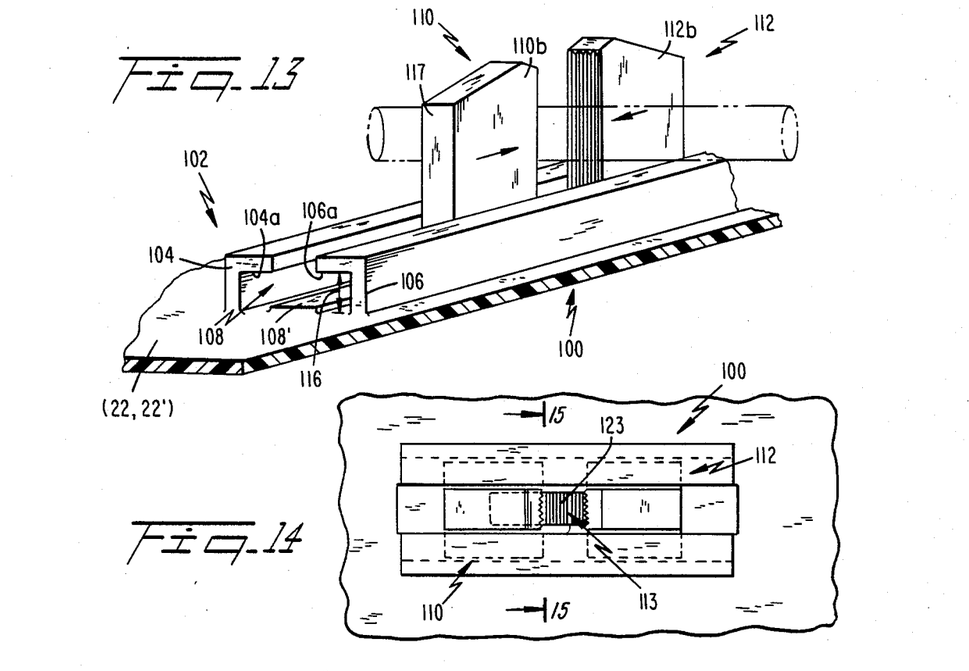
FIG. 13 is partial perspective view of another alternate preferred embodiment of a clamping arrangement according to the present invention.
FIG. 14 is a partial schematic, top plan view of the clamping arrangement of FIG. 13.

As in apparent from the above, the height of the side base portions of jaws 110 and 112 are less than the height 116 of channel 108 (adjacent the raised central section 108') to enable easy insertion and sliding of jaws 110 and 112 towards each other within the channel. To clamp a cable between jaws 110, 112, the jaws are inserted into the cable 108 at opposite ends thereof with their clamping surfaces 115 and 115' respectively facing each other. The cable is positioned transversely above the slide track 102 as shown in FIG. 13 and the jaws 110 and 112 are manually slid towards each other by finger pressure applied to the ends 117 of each jaw opposing the clamping surface. As the jaws 110 and 112 approach each other on opposite sides of the cable, the beveled free end 113b of locking tongue 113 begins to enter the recess 118, i.e., between the upper surface of central raised section 108' and recess bottom wall 122. The thickness of locking tongue 113 is sufficient to urge the upper surfaces of side base portions 114 into contact with the downward facing surfaces 104a and 106a of tracks 104 and 106. The upper surface 123 of locking tongue 113 is also formed with ridges or serrations 122 which engage and interfit with the serrations on the recessed bottom wall 120 in locking engagement. In this manner, the jaws 110 and 112 are locked together with clamped surfaces 115 and 115' in clamping contact with sheathing of the cable. The clamping surfaces 115, 115' may also be formed with vertical ridges or formations 125 that 'bite' into the cable sheathing to prevent movement of the cable along its longitudinal axis.

While particular embodiments of this invention have been shown in the drawings and described above, it will become apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A connection box for securing a sheathed cable extending along a support structure to a connector to be mounted to the connection box, comprising:
   (a) a mounting base;
   (b) a cover plate having means for supporting the connector;
   (c) connection box means, separate from both the mounting base and cover plate, for mounting the cover plate to the base in assembled relationship to the support structure to form the connection box with the cable extending through an opening formed between the mounting base and cover plate to terminate in connection with said connector; and (d) means for clamping the cable to the mounting base to prevent movement of the cable within the box relative to said opening.

2. The connection box of claim 1, wherein said clamping means includes a clamping bar and a pair of posts respectively formed on opposite sides of said opening and projecting upwardly from the base along one edge thereof, said cable extending between the posts, said clamping bar secured to upper ends of the posts.

3. The box of claim 2, further including a plurality of pairs of posts, each pair extending along one edge of the base, at least one pair formed of predetermined height which is different in height from the other pair.

4. The box of claim 2, wherein said opening lies along an axis extending perpendicular to the base edge and between the posts.

5. The box of claim 2, wherein said posts are generally cylindrical with substantially smooth exterior surfaces to prevent abrading contact with the cable sheathing.

6. The box of claim 5, wherein said clamping bar is secured to the post with screws.

7. The box of claim 2, wherein said base has a serrated gripping surface formed of at least one ridge extending between the posts in a first direction to bite into the cable sheathing to securely affix the cable to the base under clamping engagement of the clamping bar.

8. The box of claim 7, wherein said clamping bar has opposite ends secured to the posts and a central clamping section overlying the gripping surface.

9. The box of claim 8, wherein said central section has a serrated surface formed of at least one ridge.

10. The box of claim 9, wherein the ridge of the central section extends in a second direction generally perpendicular to the first direction.

11. The box of claim 9, wherein said ridge of the central section extends in a second direction different from the first direction.

12. The box of claim 9, wherein said ridges are parallel to each other and extend in substantially the same direction.

13. The box of claim 8, wherein said central section is generally parallel to opposite ends of said clamping bar and resides in a plane offset from the plane of said ends.

14. The box of claim 2, said connection box means including a connection box extending between the base and cover plate, said connection box having side walls with at least one of said walls containing said opening.

15. The box of claim 14, wherein said side wall has a breakout or knockdown section defining said opening, said breakout section of lesser thickness than surrounding portions of said side wall.

16. The box of claim 15, further including a plurality of breakout sections formed within each other and of progressively increasing nominal thickness in the direction of said surrounding portions.

17. The connection box of claim 2, wherein said mounting base is rectangular having a length dimension greater than its width dimension, and wherein two pairs of said posts are formed spaced from each other along at least one length dimension of said mounting base.

18. The box of claim 17, wherein said connection box means extends between the base and cover plate, said connection box means having side walls with at least one of said walls containing said opening, corresponding ends of said connection box means and mounting base being formed with anchoring feet and retaining lugs enabling opposite corresponding end portions of said mounting base and connection box means to pivot about an axis defined by said anchoring feet and retaining lugs, said opposite end portions being formed with latch means for securing the opposite end portion of the connection box means to the opposite end portion of the mounting base in snap-fitting engagement, said anchoring feet and retaining lugs and latch means cooperating to enable the connection box means to be mounted to the base without screw fasteners and the like.

19. The box of claim 18, wherein said clamping means includes at least a pair of clamping jaw means and means for mounting and retaining the clamping jaw means at selected positions on the mounting base with the cable extending between said pair of clamping jaw means, said mounting means including a slide track having a slide channel and each clamping jaw means including a base interfitting with the slide channel.

20. The box of claim 1, further comprising a said cable being a fiber optic cable.

21. The box of claim 1, wherein said box forms part of a local area network computer communications system.

22. A connection box for securing a sheathed cable extending along a support structure to a connector mounted to the connection box, comprising:

(a) a mounting base;

(b) a cover plate supporting the connector;

(c) means for mounting the cover plate to the base in assembled relationship to the support structure to form the connection box with the cable extending through an opening formed between the mounting base and cover plate to terminate in connection with said connector; and (d) means for clamping the cable to the mounting base to prevent movement of the cable within the box relative to said opening, wherein said clamping means includes a clamping bar and a pair of posts respectively formed on opposite sides of said opening and projecting upwardly from the base along one edge thereof, said cable extending between the posts, said clamping bar secured to upper ends of the posts, and wherein said base is a molded material and said clamping bar is integrally formed with said base and connected thereto with a frangible section.

23. A connection box for securing a sheathed cable extending along a support structure to a connector mounted to the connection box, comprising:

(a) a mounting base;

(b) a cover plate supporting the connector;

(c) means for mounting the cover plate to the base in assembled relationship to the support structure to form the connection box with the cable extending through an opening formed between the mounting base and cover plate to terminate in connection with said connector; and (d) means for clamping the cable to the mounting base to prevent movement of the cable within the box relative to said opening, wherein said clamping means includes a clamping bar and a pair of posts respectively formed on opposite sides of said opening and projecting upwardly from the base along one edge thereof, said cable extending between the posts, said clamping bar secured to upper ends of the posts, said connection box means including a connection box extending between the base and cover plate, said connection box having side walls with at least one of said walls containing said opening wherein said clamping bar is permanently formed on an interior surface of one of the box side walls above the opening and generally parallel to a lower edge of the box engageable with the base, and reinforcement means integrally formed on said interior surface to prevent upward deflecting movement of the clamping bar when in assembled relation and clamping contact with the base.

24. A connection box for securing a sheathed cable extending along a support structure to a connector mounted to the connection box, comprising:

(a) a mounting base;
(b) a cover plate supporting the connector;
(c) means for mounting the cover plate to the base in assembled relationship to the support structure to form the connection box with the cable extending through an opening formed between the mounting base and cover plate to terminate in connection with said connector; and
(d) means for clamping the cable to the mounting base to prevent movement of the cable within the box relative to said opening, wherein said clamping means includes a clamping bar and a pair of posts respectively formed on opposite sides of said opening and projecting upwardly from the base along one edge thereof, said cable extending between the posts, said clamping bar secured to upper ends of the posts, said connection box means including a connection box extending between the base and cover plate, said connection box having side walls with at least one of said walls containing said opening wherein said connection box is formed with a pair of mounting ears along one edge thereof, said ears adapted to captivate screws securing same to the base, and wherein said connection box further includes a pair of feet extending from another edge of the box located generally parallel and opposite said one edge, said mounting feet being insertable beneath the base to provide anchoring support without additional fastening means along a common adjoining side of said connection box and base proximate the feet with complete fastening support between the connection box and base being provided by the screws captivated by said mounting ears.

25. A connection box for securing a sheathed cable extending along a support structure to a connector mounted to the connection box, comprising:

(a) a mounting base;
(b) a cover plate supporting the connector;
(c) means for mounting the cover plate to the base in assembled relationship to the support structure to form the connection box with the cable extending through an opening formed between the mounting base and cover plate to terminate in connection with said connector; and
(d) clamping means for securing said cable to the mounting base by exerting a clamping force $F_1$ preventing relative movement between the clamped portion of the cable and said base, and means for securing said base to the support structure with a sufficient force such as to require a pulling force $F_2$ to separate the base from the structure, wherein $F_1 > F_2$, such that a force $F$, wherein $F > F_2$, inadvertently applied to an exterior portion of the sheathed cable outside the box or to the connection box will cause said mounting base and cover plate to be separated from the support structure without causing appreciable movement of the cable at its clamped portion relative to said base.

26. A method of connecting a sheathed cable extending along a support structure to a connector mounted to a connection box, said connection box including a mounting base, a cover plate supporting the connector, and a connection box located between the cover plate and base, said connection box having side walls defining an opening through which the sheathed cable extends into the box interior to terminate in connection with said connector, comprising the steps of:

(a) mounting the base to the support structure with screws;
(b) securing a portion of the sheathed cable to the base while leaving an end portion of the cable extending from the secured portion free from fastening movement to the connector;
(c) securing the connection box to the base with screws different from the set of screws used for mounting the base to the support structure;
(d) temporarily positioning the cover plate to the connection box such that one edge of the cover plate interfits within the lower edge of a forwardly directed recess opening of the connection box with the cover plate extending generally perpendicular to said opening;
(e) temporarily supporting said cover plate on the connection box by means of a temporary support hook gripping portions of the connection box and cover plate;
(f) wiring the cable to the connector mounted within the cover plate, wherein sole support between the connection box and the cover plate during the wiring step is provided by the temporary support hook allowing a worker to use both hands for wiring;
(g) removing the temporary support hook and the cover plate from the temporarily mounted position and securing the cover plate to the connection box with screws to substantially entirely cover said opening and to complete the installation.

27. A box for securing a cable extending along a support structure to a connector mounted to the connection box comprising:

(a) a mounting base;
(b) a cover plate supporting the connector;
(c) means for mounting the cover plate to the base in assembled relationship to the support structure to form the connection box with the cable extending through an opening formed between the mounting base and cover plate to terminate in connection with said connector; and
(d) means for clamping the cable to the mounting base, said clamping means including at least a pair of clamping jaw means and means for mounting and retaining the clamping jaw means at selected positions on the mounting base with the cable extending between said pair of clamping jaw means.

28. The connection box of claim 27, wherein said mounting means includes a slide track having a slide channel and each said clamping jaw means includes a base interfitting with the slide channel.

29. The connection box of claim 28, wherein said at least a pair of clamping jaw means includes first and second clamping jaws, said channel including a raised central section extending longitudinally within the channel, the base of the first clamping jaw having a lower surface formed with a recess interfitting with the raised central section, the bottom of the recess being spaced from the upper surface of the raised central section by portions of the base of the first clamping jaw in sliding contact with the slide channel, said second clamping jaw being formed with a locking tongue slidable along the raised central section during sliding contact of base portions of the second clamping jaw with the slide channel, wherein said locking tongue is adapted to interfit between the raised central section and first clamping jaw in the recess thereof.

30. The connection box of claim 29, wherein the bottom of said recess and an upper surface of the locking tongue engageable with each other each include a plurality of serrations or ridges adapted to lockingly engage each other.

31. The connection box of claim 30, wherein said locking tongue, recess, raised central section and slide channel geometry are dimensioned such that the locking tongue makes a wedging contact with said recess to lock the first and second clamping jaws together.

32. The connection box of claim 27, wherein said slide track is formed integrally with the upper surface of the mounting base and substantially parallel and adjacent to a peripheral edge of said mounting base.

33. The box of claim 27, further comprising a said cable being a fiber optic cable.

34. The box of claim 27, wherein said box forms a part of a local area network computer communications system.

35. A connection box for at least one of a fiber optic cable and an electrical cable, comprising a base and means for clamping a cable to the base, said clamping means including at least a pair of clamping jaw means and means for mounting and retaining the clamping jaw means at selected positions on the base with said cable extending between said pair of clamping jaw means.

* * * * *